United States Patent
Hirose et al.

(10) Patent No.: US 7,216,159 B2
(45) Date of Patent: May 8, 2007

(54) WIRELESS LAN SYSTEM FOR VIRTUAL LAN

(75) Inventors: Kouichi Hirose, Saitama (JP); Keizou Sugiyama, Saitama (JP); Hideyuki Shinonaga, Saitama (JP)

(73) Assignee: KDDI Corporation, Tokyo (JP)

( * ) Notice: Subject to any disclaimer, the term of this patent is extended or adjusted under 35 U.S.C. 154(b) by 869 days.

(21) Appl. No.: 10/456,494

(22) Filed: Jun. 9, 2003

(65) Prior Publication Data
US 2004/0172480 A1 Sep. 2, 2004

(30) Foreign Application Priority Data
Jun. 14, 2002 (JP) ............................. 2002-174250

(51) Int. Cl.
*G06F 15/173* (2006.01)
*G06F 11/00* (2006.01)
(52) U.S. Cl. ..................... 709/223; 709/238; 370/235
(58) Field of Classification Search ................ 709/203, 709/217, 223, 227, 224, 228, 238, 250; 455/411; 370/230, 235, 238
See application file for complete search history.

(56) References Cited
U.S. PATENT DOCUMENTS

| | | | |
|---|---|---|---|
| 6,847,620 B1 * | 1/2005 | Meier | 370/328 |
| 6,937,576 B1 * | 8/2005 | Di Benedetto et al. | 370/256 |
| 2003/0120763 A1 * | 6/2003 | Volpano | 709/223 |
| 2003/0120821 A1 * | 6/2003 | Thermond et al. | 709/250 |
| 2003/0172142 A1 * | 9/2003 | Su | 709/223 |
| 2003/0210671 A1 * | 11/2003 | Eglin | 370/338 |
| 2004/0214572 A1 * | 10/2004 | Thompson et al. | 455/435.2 |

OTHER PUBLICATIONS

"Virtual Bridged Local Area Networks", IEEE Std 802.1Q™, 2003 Edition.
"Port-Based Network Access Control", IEEE Std 802.1X-2001.

* cited by examiner

Primary Examiner—Ario Etienne
Assistant Examiner—El Hadji M. Sall
(74) Attorney, Agent, or Firm—Westerman, Hattori, Daniels & Adrian, LLP.

(57) ABSTRACT

An access point comprises a data table in which a correspondence relationship between a terminal ID specific to each mobile terminal and a virtual ID specific to a virtual LAN group to which each mobile terminal belongs, identifies a terminal. ID registered in a packet received from the mobile terminal, inserts a virtual LAN tag in the received packet, extracts the virtual ID corresponding to the terminal ID from the data table to register in the virtual LAN tag, and transfers it to switching means. The switching means selects an output port of the received packet based on the virtual ID registered in the virtual LAN tag of the received packet, and deletes the virtual LAN tag from the received packet and sends it.

5 Claims, 6 Drawing Sheets

Fig. 3

FRAME STRUCTURE

| DA (6) | SA (6) | FRAME TYPE (2) | DATA ( VARIABLE LENGTH ) | FCS (4) |
|---|---|---|---|---|

Fig. 4

FRAME STRUCTURE

| DA (6) | SA (6) | VLAN TAG (4) | FRAME TYPE (2) | DATA ( VARIABLE LENGTH ) | FCS (4) |
|---|---|---|---|---|---|

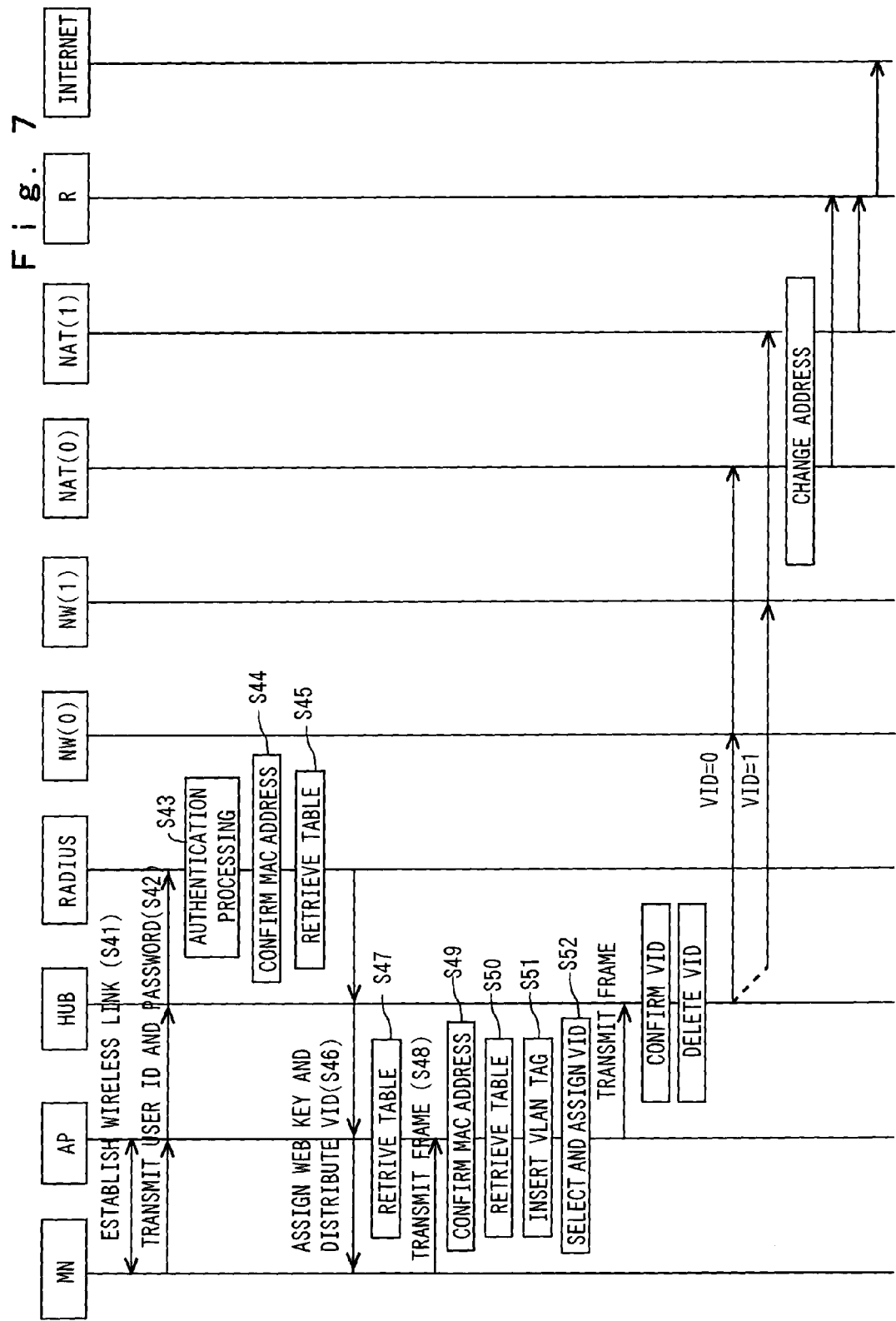

WIRELESS LAN SYSTEM FOR VIRTUAL LAN

BACKGROUND OF THE INVENTION

1. Field of the Invention

The present invention relates to a wireless LAN system for virtual LAN in which wireless terminals accommodated in a physically single LAN are virtually classified into a plurality of groups.

2. Description of the Related Art

A virtual LAN is a technique for virtually classifying terminals into groups independently of a physical connection form, and there are present a port based virtual LAN for grouping based on a port of a LAN switch, a MAC address based virtual LAN for grouping based on a MAC address of a terminal, a protocol based virtual LAN for grouping based on a protocol to be used, and the like.

In recent years, a wireless LAN has been rapidly spread instead of a conventional wired LAN. In the wireless LAN, a wireless link is established between a mobile terminal on which an Ethernet (trademark) card is mounted and an access point as a master station assuming that the mobile terminal is a slave station. The mobile terminal accesses a network via the access point. When the access point makes communication with a plurality of mobile terminals, the access point operates as a bridge or router.

However, since a wireless LAN for virtual LAN has not existed conventionally, one access point has not been able to be shared with a plurality of groups.

SUMMARY OF THE INVENTION

In the wireless LAN system for virtual LAN in which wireless terminals accommodated in a physically single LAN are virtually classified into a plurality of groups, the present invention comprises a plurality of access points for establishing a wireless link with the wireless terminals, and switching means for exchanging a frame between each access point and each virtual LAN.

Each of the access points comprises a data table storing a correspondence relationship between a terminal ID specific to each wireless terminal and a virtual ID specific to a virtual LAN group to which the wireless terminal belongs therein, means for identifying a terminal ID registered in a frame received from each wireless terminal, means for inserting a virtual LAN tag in the received frame, means for referring to the data table based on the identified terminal ID and extracting a virtual ID corresponding to the terminal ID, and means for registering the extracted virtual ID in the virtual LAN tag and transferring it to the switching means.

The switching means comprises means for identifying a virtual ID registered in a virtual LAN tag of a frame received from the access point, means for selecting a transfer destination of the received frame based on the identification result, means for deleting a virtual LAN tag from the received frame, and means for outputting a deleted frame of the virtual LAN tag to the selected transfer destination.

According to the characteristics described above, a virtual LAN tag is inserted in the Ethernet (trademark) frame transmitted form the wireless terminal and received at the access point. An identifier (VID) specific to the virtual LAN group to which the wireless terminal belongs is registered in this virtual LAN tag. Therefore, in the switching means for receiving this Ethernet (trademark) frame, the virtual LAN can be realized only by outputting the received frame to the transfer destination corresponding to the identifier (VID) registered in the virtual LAN tag. Furthermore, the virtual LAN tag is not included in the Ethernet (trademark) frame output from the switching means so that the network at the rear stage can function in a similar manner to a conventional one.

BRIEF DESCRIPTION OF THE DRAWINGS

FIG. 3 is a diagram showing a frame structure of an Ethernet (trademark) frame received at an access point from a mobile terminal;

FIG. 4 is a diagram showing a frame structure of the Ethernet (trademark) frame transferred to a switching HUB at the access point;

FIG. 7 is a diagram showing the communication procedure (upstream) according to the second embodiment.

DETAILED DESCRIPTION OF THE PREFERRED EMBODIMENTS

Figure 1:
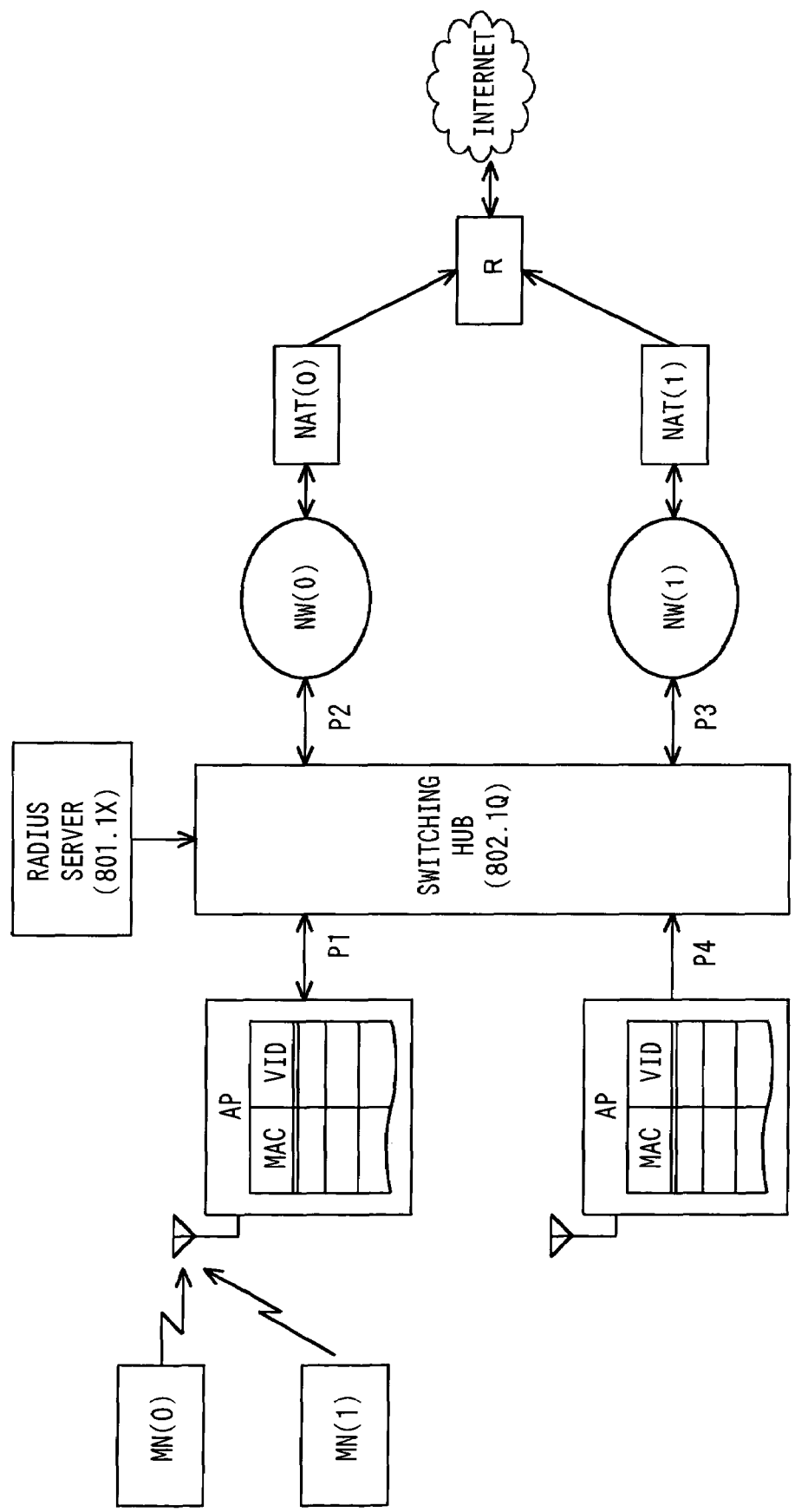
FIG. 1 is a block diagram showing a first embodiment of a wireless LAN system with a virtual LAN function.

FIG. 1 is a block diagram showing a wireless LAN system with a virtual LAN function according to a first embodiment, in which a single LAN is physically present but a plurality (two groups of group 0 and group 1) of LANs are virtually included.

A mobile terminal MN(0) belonging to the group 0 accesses a network NW(0) in the group 0 via an access point AP and a switching HUB, and further accesses the Internet via a NAT(0) and a router R.

A mobile terminal MN(1) belonging to the group 1 accesses a network NW(1) in the group 0 via an access point AP and a switching HUB, and further accesses the Internet via a NAT(1) and a router R.

The switching HUB has a function of adding/deleting a virtual LAN tag defined by the IEEE802.1Q. Wireless base stations (master stations) as the access points (AP) are connected to first and fourth ports P1 and P4 of the switching HUB in a wired manner. A wireless link is established between mobile terminals MN as a slave station and the AP.

The network NW(0) belonging to the group 0 is connected to a second port of the switching HUB. The network NW(1) belonging to the group 1 is connected to a third port of the switching HUB. The networks are connected to the Internet via NAT(0), NAT(1), and the router R, respectively. According to the present embodiment, the AP comprises a data table in which a correspondence relationship between a MAC address (MAC) as a terminal ID specific to each MN and a virtual ID (VID) specific to each virtual LAN group is previously registered.

Figure 2:
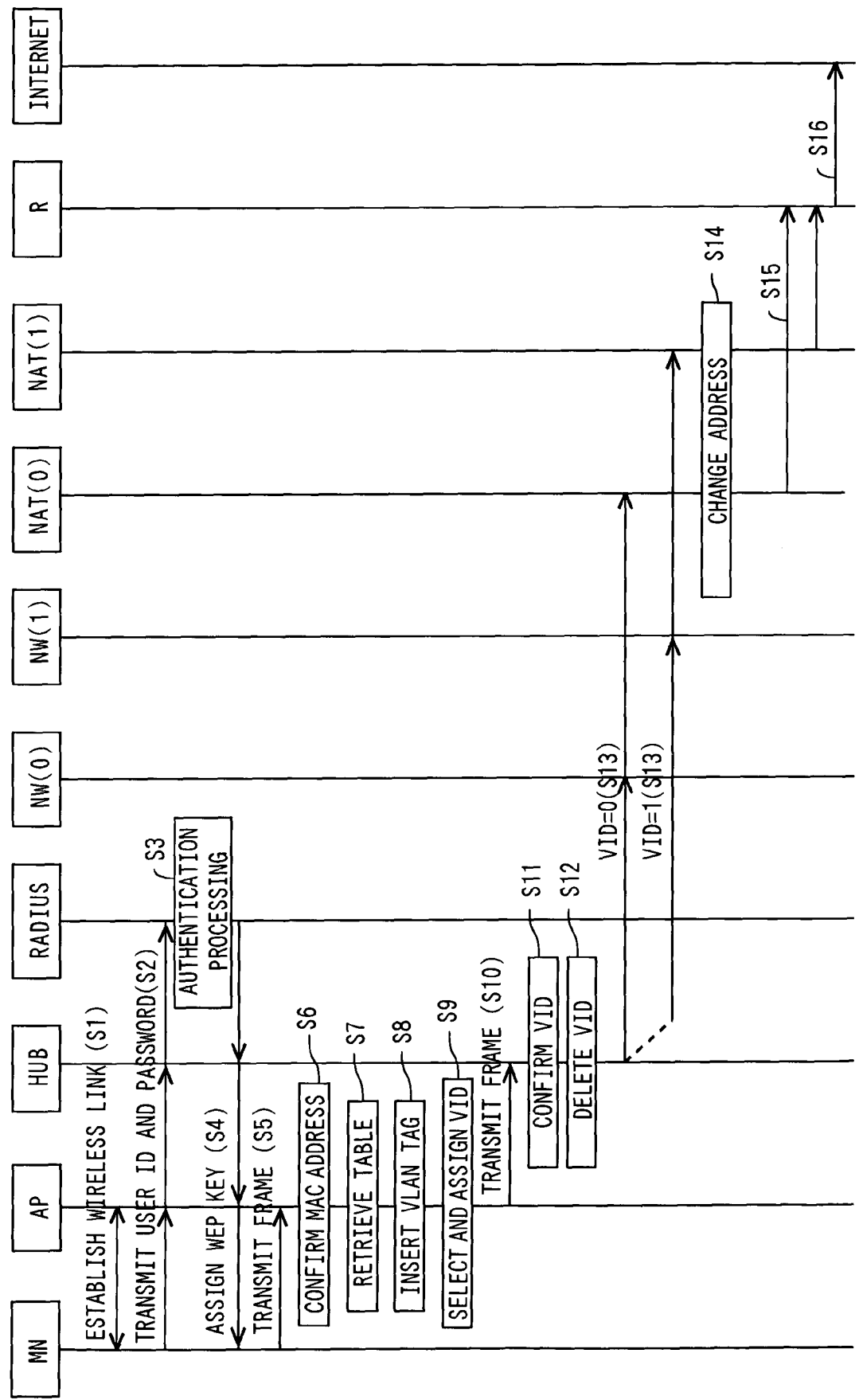
FIG. 2 is a diagram showing a communication procedure (upstream) according to the embodiment.

FIG. 2 is a diagram showing a sequence relating to an upstream of a communication protocol according to the present embodiment. In step S1, a wireless link between MN and AP is established. In step S2, a user ID and a password transmitted form the MN are notified to a RADIUS server via the switching HUB.

The RADIUS server performs authentication processing based on the IEEE802.1X in step S3. This authentication is directed for assigning a WEP key to each MN. When it is confirmed that a user is valid, the WEP key is assigned to this MN in step S4. In step S5, an Ethernet (trademark) frame is transmitted form the MN to the AP.

FIG. 3 is a diagram showing a frame structure of the Ethernet (trademark) frame, which includes a DA area (6 bytes) in which a destination MAC address is registered, an SA area (6 bytes) in which a source MAC address is registered, a frame type area (2 bytes) indicating a data protocol, a data area (variable length), and a frame check sequence area (4 bytes).

The AP confirms the source MAC address registered in the SA area of a received frame in step S6, and retrieves the data table in which the MAC/VID correspondence relationship is registered, and discriminates the VID corresponding to the source MAC address in step S7. Further, in step S8, a VLAN tag is inserted in the received Ethernet (trademark) frame.

FIG. 4 is a diagram showing a frame structure after the VLAN tag is inserted, where the VLAN tag with 4 bytes is newly inserted. The VID is registered in this VLAN tag in step S9, and this frame is transmitted to the switching HUB in step S10.

The switching HUB confirms the VID registered in the VLAN tag of the received frame in step S11, and then deletes the VLAN tag in step S12, and returns the frame structure into the structure described in FIG. 3. In step S13, the frame is output from the port P2 when the VID is an identifier of the group (0), and is output from the port P3 when the VID is an identifier of the group (1).

The NAT changes a private source IP address registered in the received frame to a global IP address based on a well-known address converting technique in step S14, and transmits it to the router R in step S15. The router R transmits the received packet on the Internet.

Figure 5:
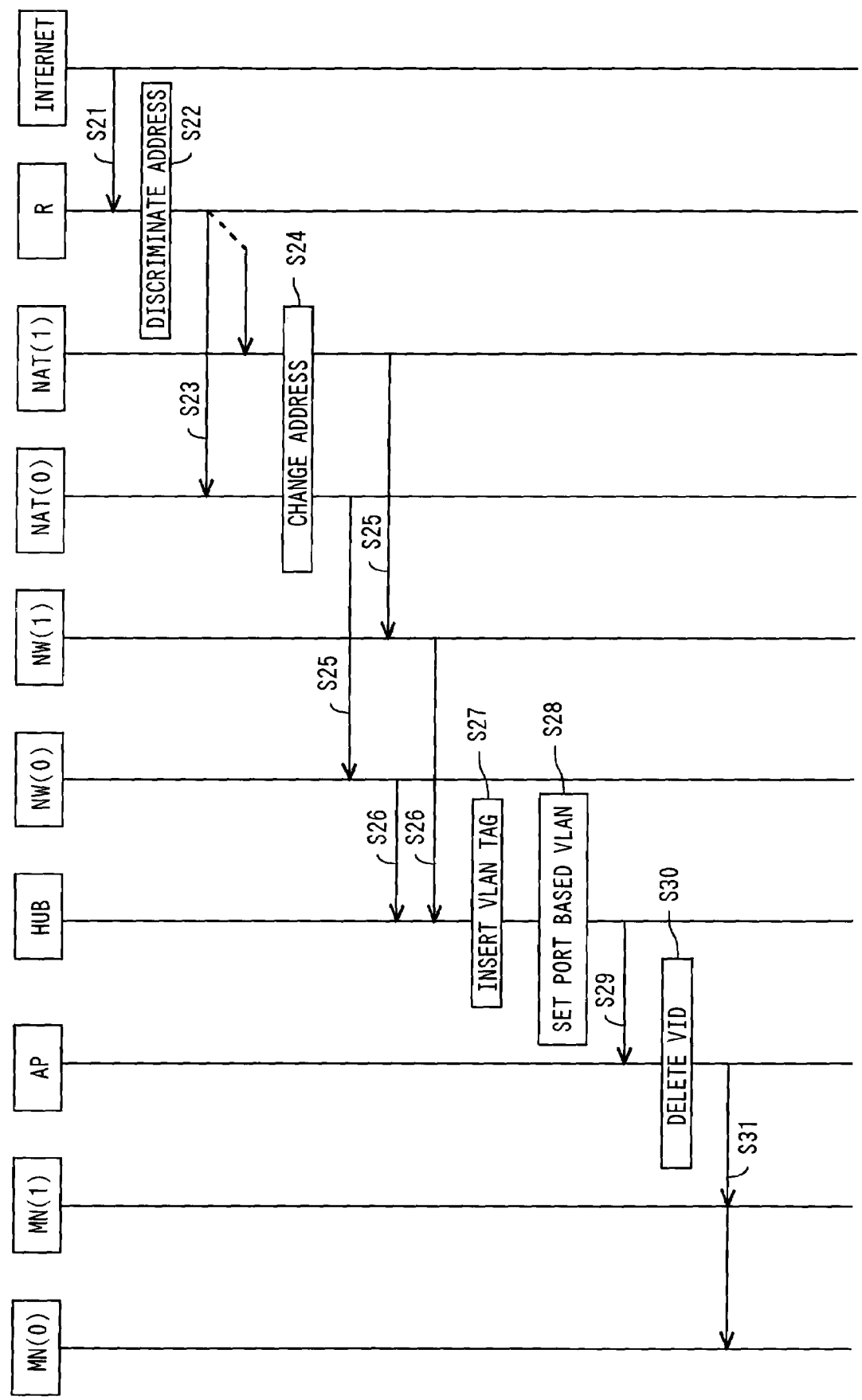
FIG. 5 is a diagram showing the communication procedure (downstream) according to the first embodiment.

FIG. 5 is a sequence diagram showing a communication procedure in a downstream where a packet is transferred from the network side to each mobile terminal NM.

The router R receives the IP packet from the Internet in step S21 and discriminates the destination group based on the destination IP address in step S22. In step S23, the received packet is transferred to the NAT(0) when the destination is the group 0, and is transferred to the NAT(1) when the destination is the group 1. In step S24, each NAT which receives the IP packet changes the global destination IP address to the private address in a reverse procedure to the step S14. In steps S25 and S26, this IP packet is transferred via the network NW of each group to the switching HUB.

In step S27, the switching HUB inserts the VLAN tag in the received frame. In step S28, the VID corresponding to the reception port is registered in the VLAN tag of each Ethernet (trademark) frame. In other words, the switching HUB sets the port based VLAN, and transmits this Ethernet (trademark) frame to the AP in step S29. The AP deletes the VLAN tag from the received frame in step S30, and then transmits it to each MN in step S31.

Figure 6:
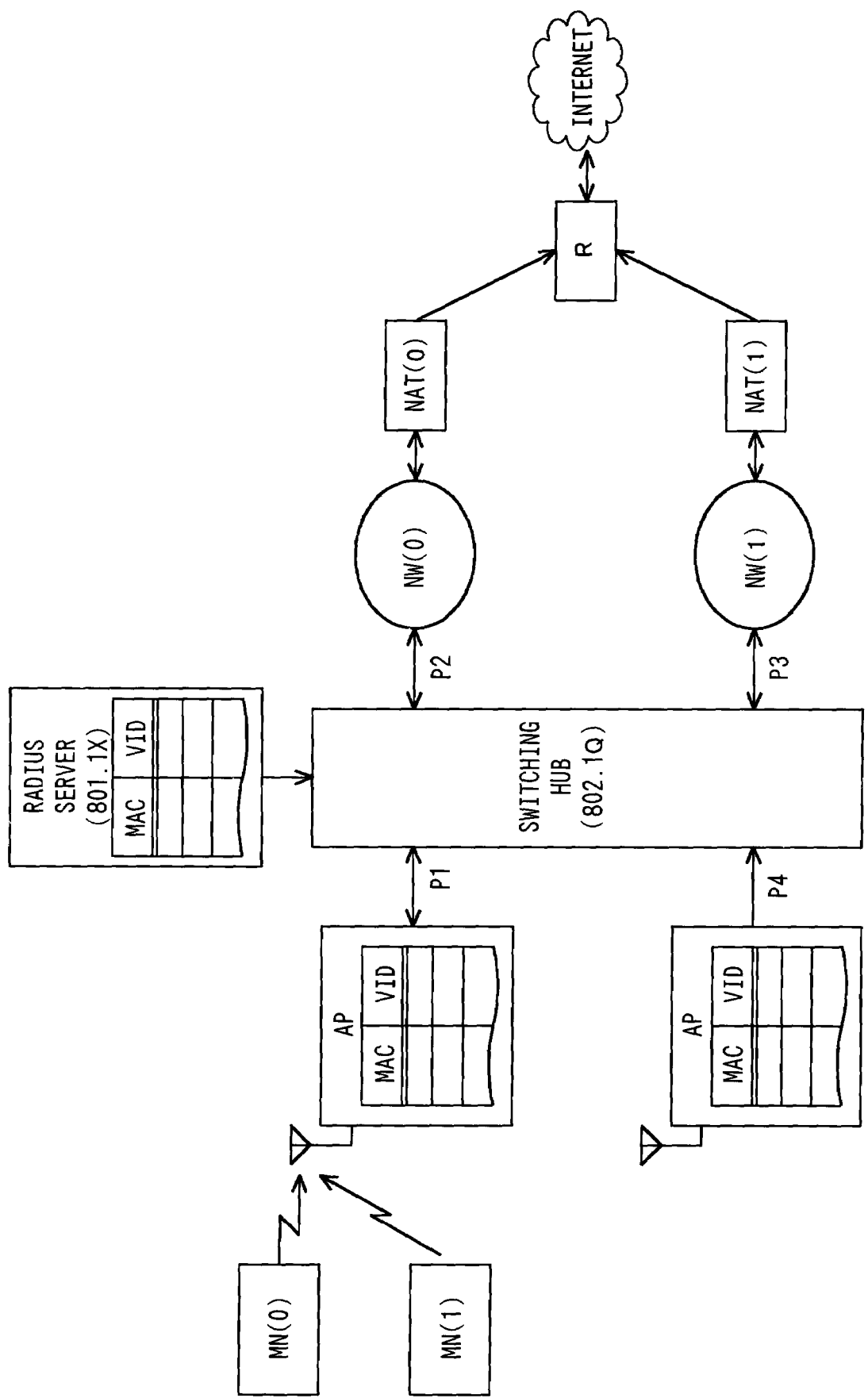
FIG. 6 is a block diagram showing a second embodiment of the wireless LAN system with a virtual LAN function.

FIG. 6 is a block diagram showing a second embodiment according to the present invention, in which like numerals identical to the above denote like or corresponding parts. The MAC/VID correspondence relationship is previously registered in the data table of each AP according to the first embodiment, but the MAC/VID correspondence relationship is registered in only the data table provided in the RADIUS server and the virtual VID is notified from the RADIUS server to each AP at the time of authentication based on the IEEE802.1X so that the configuration of each. AP is simplified in exchange for addition of the authentication procedure, according to the present embodiment. There- fore, only the correspondence relationship between the terminal ID (MAC) and the virtual ID (VID) notified from the RADIUS server is registered in the data table of each AP, and the correspondence relationship relating to all the mobile terminals is not always previously registered.

FIG. 7 is a diagram showing a sequence relating to an upstream of a communication protocol according to the present embodiment. When a wireless link is established between MN and AP in step S41, the user ID and the password transmitted form the MN are notified to the RADIUS server via the switching HUB in step S42.

In step S43, the RADIUS server performs authentication processing by the IEEE802.1X. Here, when it is confirmed that the user is valid, the MAC address of MN is confirmed in step S44, and the data table is retrieved to discriminate the VID corresponding to the MN in step S45. In step S46, the WEP key is assigned to the MN and the correspondence relationship between the MAC address and the VID is notified to the AP. In step S48, the notified correspondence relationship is registered in the data table of the AP.

In step S48, the Ethernet (trademark) frame having the frame structure described in FIG. 3 is transmitted from the MN to the AP. The AP confirms the MAC address registered in the SA area of the received frame in step S49, and discriminates the VID corresponding to the MAC by retrieving the data table instep S50. Further, the VLAN tag is inserted in the received frame in step S51, and the VID is registered in this VALN tag in step S52. The subsequent procedure and the processing procedure of the downstream are similar to those according to the first embodiment so that description thereof will be omitted.

According to the present invention, since a wireless LAN for virtual LAN can be constructed, a wireless access network used as an intra-office LAN in a company can be utilized as the Internet access network for general users. Further, in the intra-office wireless LAN in a company, it is advantageous that a network can be divided for each department even in the same network.

What is claimed is:

1. A wireless LAN system for virtual LAN in which wireless terminals accommodated in a physically single LAN are virtually classified into a plurality of groups, comprising:
    a plurality of access points(AD) for establishing a wireless link with wireless terminals; and
    switching means for exchanging a frame between each access point and each virtual LAN,
    wherein each access point comprises:
    a data table for storing a correspondence relationship between a terminal ID specific to each wireless terminal and a virtual ID specific to a virtual LAN group to which the wireless terminal belongs therein;
    means for identifying a terminal ID registered in a frame received from each wireless terminal;
    means for inserting a virtual LAN tag in the received frame;
    means for referring to the data table based on the identified terminal ID and extracting a virtual ID corresponding to the terminal ID; and
    means for registering the extracted virtual ID in the virtual LAN tag and transferring it to the switching means, and
    the switching means comprises:
    means for identifying a virtual ID registered in a virtual LAN tag of a frame received from the access point;
    means for selecting a transfer destination of the received frame based on the identification result;

means for deleting a virtual LAN tag from the received frame; and means for outputting the deleted frame of the virtual LAN tag to the selected transfer destination.

2. The wireless LAN system for virtual LAN according to claim 1, wherein a correspondence relationship between a terminal ID of each wireless terminal and a virtual ID is previously registered in a data table of each of the access points.

3. The wireless LAN system for virtual LAN according to claim 1, further comprising a server in which a correspondence relationship between each terminal ID and a virtual ID is previously registered, wherein the server comprises:

means for acquiring a terminal ID from a wireless terminal which establishes a wireless link with an access point;

means for extracting a virtual ID corresponding to the acquired terminal ID; and means for notifying the extracted virtual ID to the access point, and the access point registers the virtual ID notified from the server in the data table in correspondence to the terminal ID.

4. The wireless LAN system for virtual LAN according to claim 3, wherein the server is an authentication server, and performs acquiring of the terminal ID, extracting and notifying of a virtual ID in an authentication processing of the wireless terminal.

5. The wireless LAN system for virtual LAN according to any one of claims 1, wherein the switching means comprises:

means for inserting a virtual LAN tag in a frame received from a virtual LAN;

means for registering a virtual ID corresponding to an input port of the received frame in the virtual LAN tag; and means for sending a received frame inserted in the virtual LAN tag to an access point connected to a port corresponding to a virtual ID registered in the virtual LAN tag, and the access point deletes a virtual LAN tag inserted in a frame received from the switching means and transits it to each mobile terminal.

* * * * *